June 10, 1924.

F. GIRARD 1,497,499

SUPPORT FOR MEDICAL APPARATUS AND THE LIKE

Filed June 19, 1922

Inventor
Fritz Girard
by *illegible*
Attorney.

Patented June 10, 1924.

1,497,499

UNITED STATES PATENT OFFICE.

FRITZ GIRARD, OF HANAU-ON-THE-MAIN, GERMANY, ASSIGNOR TO THE FIRM QUARZ-LAMPEN-GESELLSCHAFT MIT BESCHRANKTER HAFTUNG, OF HANAU-ON-THE-MAIN, GERMANY.

SUPPORT FOR MEDICAL APPARATUS AND THE LIKE.

Application filed June 19, 1922. Serial No. 569,534.

*To all whom it may concern:*

Be it known that I, FRITZ GIRARD, a citizen of Germany, residing a Hanau-on-the-Main, Germany, have invented certain new and useful Improvements in Supports for Medical Apparatus and the like, of which the following is a specification.

My invention has reference to supports or standards such as are used for chemical, medical and scientific apparatus, and it is particularly intended to generally improve devices of this kind, and to increase the adaptability and adjustability thereof, and to securely lock them in position, and to prevent injury to the apparatus in case of unforeseen accidental slipping of the supporting means. Supports with vertically adjustable supporting arm, such as have been used heretofore for medical and scientific apparatus, for instance in connection with illuminating and irradiating devices, are usually provided with a slide for the supporting arm which admits of being locked by a screw or the like in any desired position. The handling of supports of this kind is rather inconvenient, particularly in the case of supporting comparatively heavy apparatus, and the locking by means of clamping screws is, moreover, very unreliable.

In order to facilitate the vertical adjustment it has already been suggested to effect the guiding of the sliding member of the supporting arm along the post of the support by means of two oppositely and staggeredly arranged rollers, in combination with a counter weight for balancing the supporting arm which in this case is no longer retained by friction, the said counter weight being connected to the supporting arm by means of a rope which is passed upon a sheave or the like, mounted at the top of said post. By means of the arrangement of the two guide rollers which transmit the torque produced by the loading of the supporting arm upon the post of the support and which in view thereof should preferably be mounted at as large a distance from each other as possible the frictional resistances occurring upon the adjustment of the supporting arm are greatly reduced. With such construction, however, it becomes necessary to provide special safety and locking means for the purpose of preventing the dropping down of the supporting arm in the case of rupture of the rope to which the counterweight is attached.

This invention in its broad aspects refers to a particular construction of supports of the kind referred to in which provision is made for the locking and catching member intended to prevent the slipping off of the supporting arm in case of rupture of the rope, for effecting the securing in position of the clamp by means of an annular disc operatively connected to the locking member, and surrounding the post with play, and adapted to be tilted into an inclined position upon the failure to work of the balancing member which compensates the weight of the supporting arm. The annular disc is preferably tiltingly and pivotally mounted adjacent its periphery upon a supporting lug of the sliding member, and is retained in the horizontal position contrary to the action of spring pressure by the supporting rope of the compensating member, the supporting rope being operatively secured to the annular disc beyond the supporting lug referred to. In order to at the same time reduce the weight of the support the counter weight of the supporting arm may be replaced in a modified form of construction by a spring drum or the like mounted at the top portion of the post, and upon which the supporting rope is wound under tension.

The invention is shown by way of example in various forms of embodiment upon the accompanying drawing, Figure 1 showing a support with a sliding member according to this invention, and with balancing counter weight.

Figure 1:
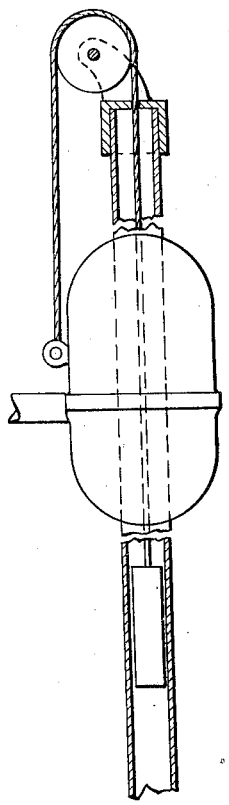

Referring to the drawings, the slide A which serves for effecting the vertical displacement is preferably provided with a somewhat larger bore than is necessary for the smooth guiding of the support post. In the interior of the slide two guide rollers B are arranged on both sides of the post and at a comparatively considerable distance from each other. These rollers which are preferably adapted to conform to the curvature of the post, as appears from Figure 4, transmit the strains produced by the torque of the supporting arm to the supporting post, so that the slide can always be easily displaced, the sliding friction being replaced by the considerably reduced roller friction.

Figure 2:
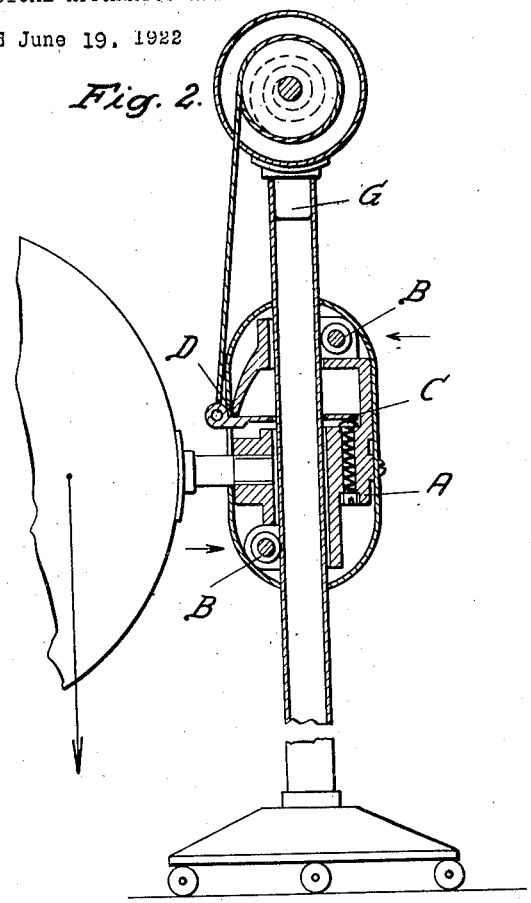
Figures 2 and 3 illustrate the support with a balancing member consisting of a spring drum and with the catching device in two different positions.

In the interior of the slide there is also arranged a catching ring, preferably disc shaped and surrounding the supporting post with play. This catching ring is adapted to rock upon a supporting lug D of the slide, and it is provided with an eye E for suspending the supporting rope. Upon the side opposite to the point of action of the supporting rope a spring F is mounted which is ordinarily kept depressed by the torque produced upon the supporting rope at the eye E. This position is illustrated in Figure 2. The supporting rope may be kept taut by a balancing weight which is preferably arranged to slide within the supporting post.

Figures 3, 4:
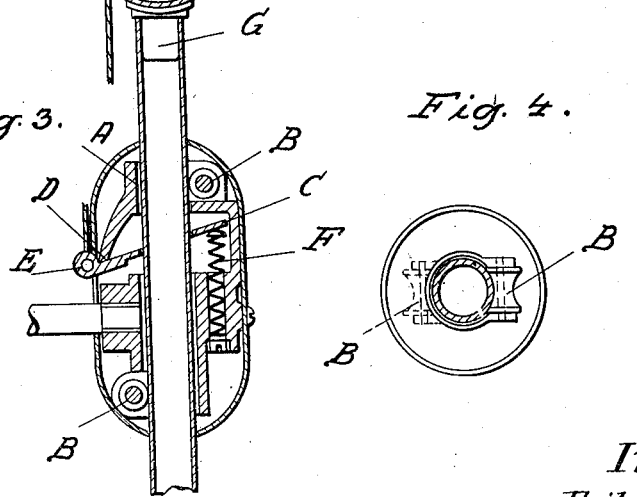
Figure 4 is a cross sectional view of the slide of the support.

In the case of rupture of the rope the catching ring is rocked through the small angle provided for by the play, for instance through an angle of ten degrees upwards about the lug D as a pivot, as shown in Figure 3. The catching arm being inclined relatively to the post, becomes clamped thereto, inasmuch as the entire weight of the load presses by means of the lug upon the lower portion of the catching ring and by this means the slide with the supporting arm is maintained in the particular position it occupies.

Instead of the weight balancing means illustrated in Figure 1, the balancing means represented in Figures 2 and 3 may preferably be employed with a view of further reducing the dead weight. This balancing means comprises a rope drum H mounted at the top of the supporting post and upon which the rope is wound, and is kept taut by means of a spiral spring counteracting the pull of the rope. The rope drum according to Figures 2 and 3 as well as the sheave according to Figure 1, are preferably connected to the top of the supporting post in such a manner as to allow of being turned about the axis of the same. For this purpose the rope drum may, for instance, be inserted in the hollow post by means of a stud G. By means of this arrangement in combination with the particular construction of the slide, and of the guide rollers B which admit of a rotation of the slide a lateral oscillating movement of the supporting arms is possible for the purpose of exact adjustment of the apparatus mounted thereon.

My invention is not confined to the particular structural elements and arrangements of parts herein shown by way of example, but changes and modifications may occur to suit particular conditions and the convenience and requirements of the user. Two or more supporting arms may be employed, and various other changes may be made within the meaning of the claims and without deviating from the spirit of my invention.

I claim:—

1. Safety device for adjustable lamp stands and the like comprising in combination, a plain cylindrical standard, a slide arranged for free movement on said standard both in longitudinal and circumferential directions and adapted to support a lamp or the like, a brake disc embracing said standard with some play, means connected with said slide for holding said brake disc in a position at right angles to said standard, means on said standard for partly counterbalancing the weight of said slide and lamp or the like, said means being connected with one side of said disc so as to keep it in contact with said holding means and means arranged for cooperation with the other side of said disc and adapted to move it into angular position relatively to said standard whenever the connection between said counterbalancing means and said disc is severed.

2. Safety device for adjustable lamp stands and the like comprising in combination, a plain cylindrical standard, a slide arranged for free movement on said standard both in longitudinal and circumferential directions and adapted to support a lamp or the like, an annular brake disc embracing said standard with some play and normally rotating on said slide in a position substantially at right angles to said standard, an abutment for the upper face of said disc connected with said slide, means for exerting one-sided pressure on the lower face of said disc tending to move it into oblique position and counterbalancing means on said standard connected with said disc near said abutment and adapted to normally counteract said pressure exerting means.

3. Safety device for adjustable lamp stands and the like comprising in combination, a plain cylindrical standard, a tubular slide arranged on said standard for free longitudinal and circumferential motion, an arm extending from the upper end of said slide around said standard and ending some distance above the upper face of said slide, an annular brake disc embracing said standard and resting on said slide with its upper face in contact with the free end of said arm, a spring on said slide arranged to exert one-sided pressure from below on the side of said disc averted from the free end of said arm, counterbalancing means on said standard and a connection between said counterbalancing means and that part of said disc which adjoins said free end.

In testimony whereof I affix my signature.

FRITZ GIRARD.